(12) United States Patent
Vujcic et al.

(10) Patent No.: US 8,264,945 B2
(45) Date of Patent: Sep. 11, 2012

(54) METHOD FOR SIGNAL MAPPING AND SIGNAL TRANSMISSION WITH SUBCARRIER SHIFT SCHEMES

(75) Inventors: Dragan Vujcic, Limours (FR); Hyun Woo Lee, Anyang-si (KR); Seung Hee Han, Anyang-si (KR); Min Seo Hon, Anyang-si (KR); Jin Sam Kwak, Anyang-si (KR); Dong Cheol Kim, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 250 days.

(21) Appl. No.: 12/739,672

(22) PCT Filed: Oct. 15, 2008

(86) PCT No.: PCT/KR2008/006079
§ 371 (c)(1),
(2), (4) Date: Jun. 10, 2010

(87) PCT Pub. No.: WO2009/054644
PCT Pub. Date: Apr. 30, 2009

(65) Prior Publication Data
US 2010/0246378 A1    Sep. 30, 2010

Related U.S. Application Data

(60) Provisional application No. 60/982,433, filed on Oct. 25, 2007.

(30) Foreign Application Priority Data

Jan. 29, 2008   (KR) .................. 10-2008-0009035

(51) Int. Cl.
*H04J 11/00* (2006.01)
*H04K 1/10* (2006.01)
*H04L 27/28* (2006.01)

(52) U.S. Cl. ........................................ 370/203; 375/260
(58) Field of Classification Search ................... None
See application file for complete search history.

(56) References Cited

U.S. PATENT DOCUMENTS

| | | | |
|---|---|---|---|
| 6,690,740 B1 * | 2/2004 | Mattisson et al. | 375/295 |
| 2004/0208253 A1 | 10/2004 | Joo | |
| 2005/0276336 A1 | 12/2005 | Khan | |
| 2009/0245197 A1 * | 10/2009 | Ma et al. | 370/330 |
| 2009/0274238 A1 * | 11/2009 | Taniguchi | 375/272 |

* cited by examiner

Primary Examiner — Xavier Szewai Wong
(74) Attorney, Agent, or Firm — McKenna Long & Aldridge LLP

(57) ABSTRACT

A signal mapping method and a signal transmission method applying a subcarrier shift method are described. A signal mapping method using shifted subcarriers includes shifting positions of data subcarriers by as much as a frequency band corresponding to half of spacing between data subcarriers on a frequency axis, and shifting positions of random access preamble subcarriers by as much as a frequency band corresponding to half of spacing between the data subcarriers and to a specific ratio of spacing between the random access preamble subcarriers, and mapping data and a random access preamble to the data subcarriers and the random access preamble subcarrier, respectively. Even when the spacing between the data subcarriers is a multiple of the spacing between the random access preamble subcarriers, DC distortion can be minimized.

3 Claims, 4 Drawing Sheets

METHOD FOR SIGNAL MAPPING AND SIGNAL TRANSMISSION WITH SUBCARRIER SHIFT SCHEMES

This application is a 35 U.S.C. §371 National Stage entry of International Application No. PCT/KR2008/006079, filed on Oct. 15, 2008, and claims benefit of Provisional Application No. 60/982,433, filed on Oct. 25, 2007 and Korean Patent Application No. 10-2008-0009035, filed on Jan. 29, 2008, each of which is hereby incorporated by reference in its entirety for all purposes as if fully set forth herein.

TECHNICAL FIELD

The present invention relates to a discrete Fourier transform-spreading (DFT-S) orthogonal frequency division multiple access (OFDMA) system, and more particularly, to a method for solving a direct current (DC) offset problem during signal transmission.

BACKGROUND ART

A wireless communication system generally uses intermediate frequency (IF) conversion during signal transmission to convert a transmission signal into a signal having a carrier frequency for transmission or into a baseband signal for reception. However, recently, a direct conversion method has widely been used without IF conversion due to costs, etc.

Direction conversion receivers illustrated in FIGS. 1 and 2 have a very simple topology form in which a mixer 140 mixes a received signal with a local signal of the same frequency as the received signal so that a central frequency of a signal can be located in a DC, and a low pass filter 120 selects a channel. A radio frequency (RF) signal received from an antenna is amplified to a low-noise signal while passing through a low-noise amplifier (LNA) 110.

When using direct conversion, if an RF received by a local oscillator (LO) 130 for generating a frequency identical to a carrier frequency is the same as an RF received on air, an unnecessary component is generated in a DC part in terms of hardware. This is called DC offset.

FIG. 1 illustrates DC offset generated by a leakage component of the local oscillator 130. FIG. 2 illustrates DC offset generated by an interference signal having the same frequency as a carrier frequency.

In direct conversion, an RF signal is directly converted into a baseband signal through the local oscillator 130. In this conversion process, if a leakage component of the local oscillator 130 is generated or the same frequency as RF is added without filtering, a DC signal, a frequency of which is 0 Hz, caused by the same frequency, may be self-mixed. Such a DC offset component serves as a serious obstacle to readout of a baseband signal and deteriorates a signal-to-noise ratio (SNR). Accordingly, coping with the DC offset is a difficult problem to overcome in direction conversion.

To solve such a problem, in pulse mode communication employing a time slot, such as a global system for mobile communications (GSM), a method is used for discharging a DC charge in a time interval during which communication is not performed. In code division multiple access (CDMA), a self-calibration method is used due to a complicated modulation scheme. In OFDM-based communication, the DC offset problem is solved such that no signal is carried on a subcarrier corresponding to DC, that is, by including '0' in the subcarrier. However, in DFT-S OFDMA, since DC offset is reduced to some degree through DFT-despreading, no particular process is performed for transmission. In uplink of 3$^{rd}$ generation partnership protocol (3GPP) long term evolution (LTE) to which single carrier (SC)-FDMA, which is a sort of DFT-S OFDMA, is applied, half of spacing between data subcarriers is shifted to reduce an influence caused by the DC offset. According to specifications up to now, spacing between uplink subcarriers is 15 KHz and 7.5 KHz is shifted during transmission.

FIG. 3 illustrates a conventional method for preventing DC distortion.

In 3GPP LTE for example, the first SC-FDMA symbol is transmitted as a time-continuous signal as indicated by the following Equation 1:

$$s_l(t) = \sum_{k=-\lfloor N_{RB}^{UL} N_{SC}^{RB}/2 \rfloor}^{\lfloor N_{RB}^{UL} N_{SC}^{RB}/2 \rfloor - 1} a_{k^{(-)},l} \cdot e^{j2\pi(k+1/2)\Delta f(t - N_{CP,l} T_S)} \quad \text{[Equation 1]}$$

where $0 \le t < (N_{CP,l}+N) \times T_s$, $k^{(-)}=k+\lfloor N_{RB}^{UL} N_{SC}^{RB}/2 \rfloor$, N=2048, and $\Delta f$=15 kHz. In Equation 1, $$\frac{1}{2}\Delta f$$

indicates an operation shifting half of spacing between subcarriers. In the above example, $$\frac{1}{2}\Delta f$$

means a 7.5-KHz shift.

To prevent DC distortion of data of uplink SC-FDMA in LTE, the above frequency shift method is used to shift all uplink channels by an absolute value of 7.5 KHz.

Referring to FIG. 3, a subcarrier 310 before shift is partially overlapped with a DC subcarrier position, while a subcarrier 320 after shift is not overlapped with the DC subcarrier position.

Meanwhile, a random access channel (RACH) is a channel used for a mobile station to obtain initial uplink synchronization. When a mobile station is turned on or enters an active mode from a long-time idle mode, the RACH is used to reset the uplink synchronization. The RACH can be used without adjusting time or frequency synchronization.

A time-continuous random access signal using 6 resource blocks, that is, 72 subcarriers in LTE is transmitted as indicated by the following Equation 2.

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})} \quad \text{[Equation 2]}$$

where $0 \leq T_{PRE} + T_{CP}$ and $k_0 = k_{RA} N_{SC}^{RB} - N_{RB}^{UL} N_{SC}^{RB}/2$. In Equation 2, $\beta_{PRACH}$ denotes an amplitude scaling factor. A position in a frequency domain is controlled by $k_{RA}$ ($0 \leq k_{RA} \leq N_{RB}^{UL} - 6$). $K = \Delta f/\Delta f_{RA}$ denotes a difference between spacing between random access preamble subcarriers and spacing between uplink data subcarriers. $\Delta f_{RA}$ denotes spacing between the random access preamble subcarriers and $\phi$ denotes a fixed offset of a frequency domain of the random access preamble within resource blocks. $\Delta f_{RA}$ and $\phi$ are defined as follows.

TABLE 1

| Frame structure | Burst format | $\Delta f_{RA}$ | $\phi$ |
|---|---|---|---|
| Type 1 | 0-3 | 1250 Hz | 12 |
| Type 2 | 0 | 7500 Hz | 2 |
|  | 1 | 1875 Hz | 9 |

In Equation 2, $$\sum_{n=0}^{N_{ZC}-1} x_{u,v}(n) \cdot e^{-j\frac{2\pi nk}{N_{ZC}}}$$

indicates a DFT-S operation of a Zadoff-Chu (ZC) sequence $x_{u,v}(n)$, and $$\sum_{k=0}^{N_{ZC}-1} (.) \cdot e^{j2\pi(k+\varphi+K(k_0+1/2))\Delta f_{RA}(t-T_{CP})}$$

indicates a term related to time-domain signal conversion through inverse discrete Fourier transform (IDFT) or inverse fast Fourier transform (IFFT) and to frequency shift.

$\Delta f$ is 15 KHz, while $\Delta f_{RA}$ becomes 1250 Hz, 7500 Hz, or 1875 Hz according to a frame structure type and a burst format.

FIG. 4 illustrates a process of shifting a random access preamble subcarrier according to the conventional method for preventing DC distortion.

When half of spacing between subcarriers, for example, 7.5 KHz can be divided by $\Delta f_{RA}$ of 1250 Hz, 7500 Hz, or 1875 Hz, even though $$\frac{1}{2}\Delta f$$

is shifted with respect to RACH, an RACH preamble may be transmitted at a position 410 of a DC subcarrier. Accordingly, a DC offset problem is not solved. In case of RACH having spacing of 1250 Hz between subcarriers, data avoids DC distortion using a frequency shifted by $$\frac{1}{2}\Delta f$$

of 7.5 KHz, while RACH uses a frequency domain with narrow spacing of $\Delta f_{RA}$ of 1250 Hz based on the frequency position shifted by $$\frac{1}{2}\Delta f$$

of 7.5 KHz. In this case, since 7.5 KHz is a multiple of $\Delta f_{RA}$, a subcarrier of a specific RACH uses the DC subcarrier position.

Even though $\Delta f_{RA}$ is 7500 Hz or 1875 Hz, since $\Delta f$ is a multiple of $\Delta f_{RA}$, the same phenomenon occurs.

DISCLOSURE

Technical Problem

An object of the present invention devised to solve the problem lies in providing a signal mapping method to which a subcarrier shift method is applied, which can avoid DC subcarrier distortion during RACH transmission.

Another object of the present invention devised to solve the problem lies in providing a signal transmission method to which the above subcarrier shift method is applied.

Technical Solution

The object of the present invention can be achieved by providing a signal mapping method using shifted subcarriers, including shifting positions of data subcarriers by as much as a frequency band corresponding to half of spacing between data subcarriers on a frequency axis, and shifting positions of random access preamble subcarriers by as much as a frequency band corresponding to half of spacing between the data subcarriers and to a specific ratio of spacing between the random access preamble subcarriers, and mapping data and a random access preamble to the data subcarriers and the random access preamble subcarrier, respectively.

The specific ratio of the spacing between the random access preamble subcarriers may be half of the spacing between the random access preamble subcarriers.

The mapping of the random access preamble may map the random access preamble to subcarriers except for random access preamble subcarriers interfering with subcarriers of neighboring frequency bands according to shift.

In another aspect of the present invention, provided herein is a signal mapping method using the shifted subcarriers, including shifting both positions of data subcarriers and positions of random access preamble subcarriers by as much as a frequency band corresponding to half of spacing between the data subcarriers and to a specific ratio of spacing between the random access preamble subcarriers, on a frequency axis, and mapping data and a random access preamble to the data subcarriers and the random access preamble subcarriers, respectively.

The specific ratio of the spacing between the random access preamble subcarriers may be half of the spacing between the random access preamble subcarriers.

In a further aspect of the present invention, provided herein is a signal mapping method using shifted subcarriers, including shifting both positions of data subcarriers and positions of random access preamble subcarriers by as much as a frequency band corresponding to half of spacing between the data subcarriers on a frequency axis, and mapping data to the data subcarriers and mapping a random access preamble to subcarriers except for a subcarrier corresponding to a DC subcarrier position among the positions of the random access preamble subcarriers.

The mapping of the random access preamble may reduce a sequence length of the random access preamble by as much as a subcarrier length corresponding to the DC subcarrier position.

The mapping of the random access preamble may puncture a sequence of the random access preamble corresponding to the DC subcarrier position.

The object of the present invention can be achieved by providing a signal transmission method using shifted subcarriers, including shifting positions of data subcarriers by as much as a frequency band corresponding to half of spacing between data subcarriers on a frequency axis, and shifting positions of random access preamble subcarriers by as much as a frequency band corresponding to half of spacing between the data subcarriers and to a specific ratio of spacing between the random access preamble subcarriers, mapping data and a random access preamble to the data subcarriers and the random access preamble subcarrier, respectively, and transmitting the mapped data and random access preamble to an uplink.

In another aspect of the present invention, provided herein is a signal transmission method fusing shifted subcarriers, including shifting both positions of data subcarriers and positions of random access preamble subcarriers by as much as a frequency band corresponding to half of spacing between the data subcarriers and to a specific ratio of spacing between the random access preamble subcarriers, on a frequency axis, mapping data and a random access preamble to the data subcarriers and the random access preamble subcarriers, respectively, and transmitting the mapped data and random access preamble to an uplink.

In a further aspect of the present invention, provided herein is a signal transmission method using the shifted subcarriers, including shifting both positions of data subcarriers and positions of random access preamble subcarriers by as much as a frequency band corresponding to half of spacing between the data subcarriers on a frequency axis, mapping data to the data subcarriers and mapping a random access preamble to subcarriers except for a subcarrier corresponding to a DC subcarrier position among the positions of the random access preamble subcarriers, and transmitting the mapped data and random access preamble to an uplink.

Advantageous Effects

According to exemplary embodiments of the present invention, DC distortion can be minimized even though data subcarrier spacing is a multiple of a random access preamble subcarrier spacing.

DESCRIPTION OF DRAWINGS

The accompanying drawings, which are included to provide a further understanding of the invention, illustrate embodiments of the invention and together with the description serve to explain the principle of the invention.

In the Drawings.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Hereinafter, a description will be given of the case where spacing between data subcarriers is 15 KHz and spacing between random access preamble subcarriers is 1250 Hz. However, spacing of 15 KHz or 1250 Hz between subcarriers is only exemplary and the present invention is not limited thereto.

Figure 1:
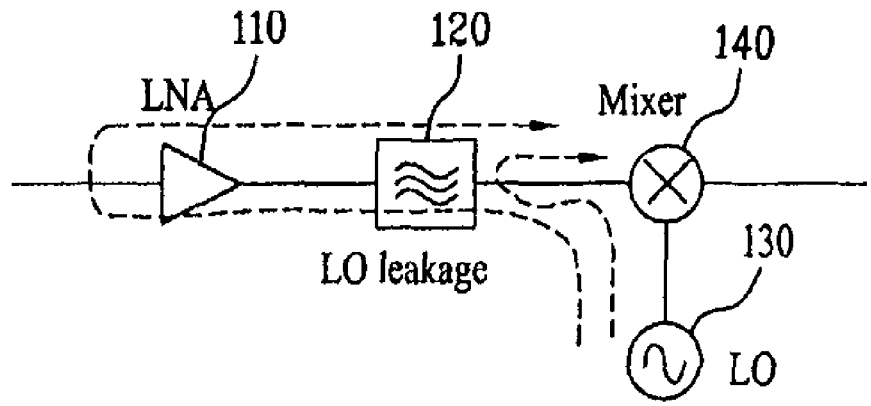
FIG. 1 illustrates a process in which DC offset is generated by a leakage component of a local oscillator.
Figure 2:
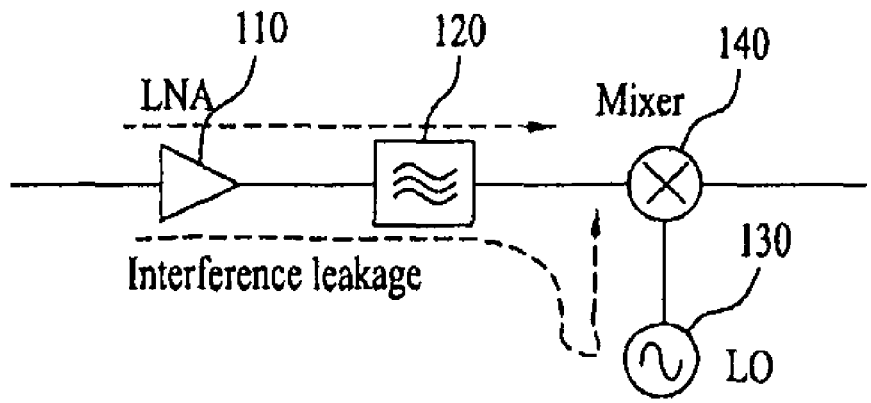
FIG. 2 illustrates a process in which DC offset is generated by the same frequency as an RF.
Figure 3:
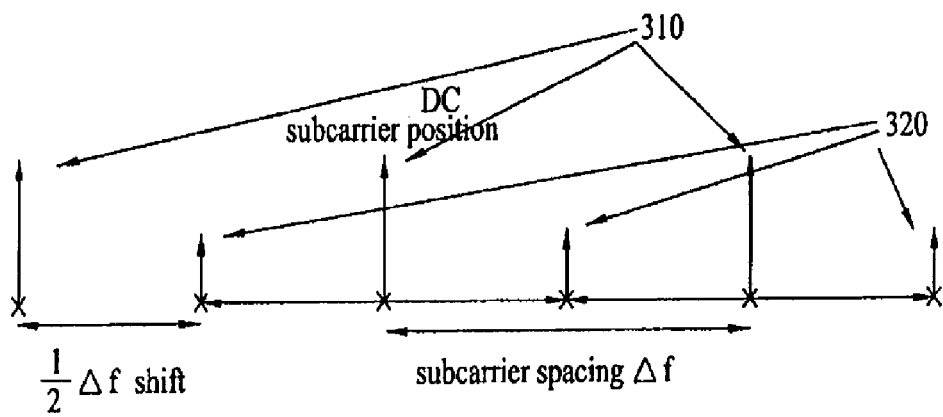
FIG. 3 illustrates a conventional method for preventing DC distortion.
Figure 4:
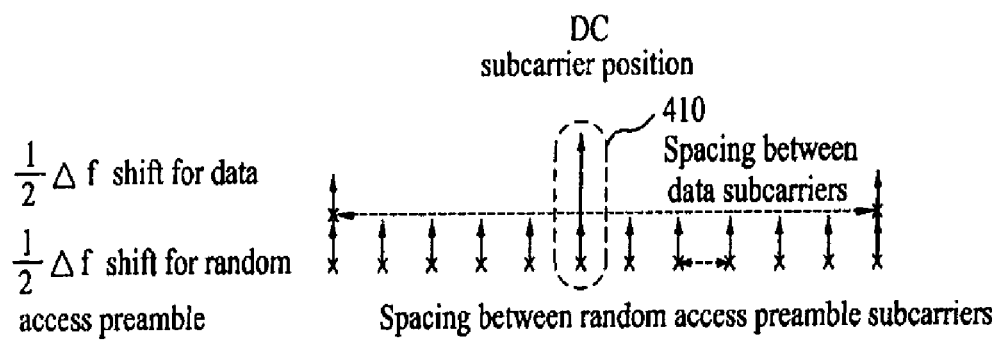
FIG. 4 illustrates a process of shifting a random access preamble subcarrier according to the conventional method for preventing DC distortion.
Figure 5:
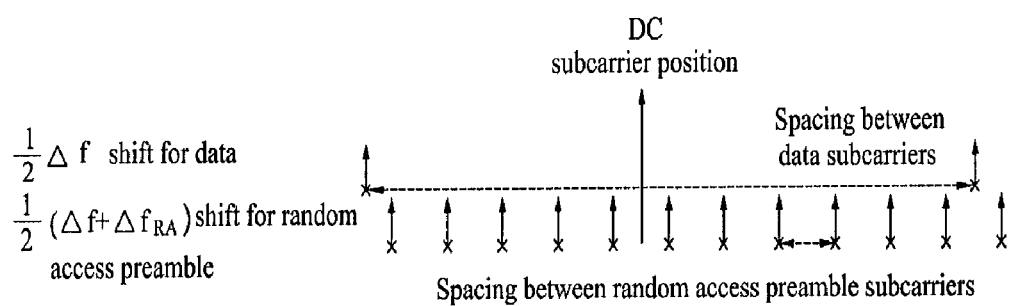
FIG. 5 illustrates a subcarrier shift method according to an exemplary embodiment of the present invention.

FIG. 5 illustrates a subcarrier shift method according to an exemplary embodiment of the present invention.

To solve a problem generated when a random access preamble is transmitted at a DC subcarrier position, a shift value which is different from data subcarriers is applied to random access preamble subcarriers. For example, if data uses a shift value of $$\frac{1}{2}\Delta f,$$

the random access preamble may use a shift value of $$\frac{1}{2}(\Delta f + \Delta f_{RA}).$$

Then an influence caused by DC distortion in a data domain can be reduced and an influence caused by DC distortion in the random access preamble can be reduced to half.

To shift the random access preamble subcarriers, other values except for $$\frac{1}{2}(\Delta f + \Delta f_{RA})$$

may be used.

Meanwhile, if the random access preamble subcarriers interfere with neighboring frequency band subcarriers due to shift, the random access preamble may be mapped to subcarriers other than the interfering random access presumable subcarriers.

Figure 6:
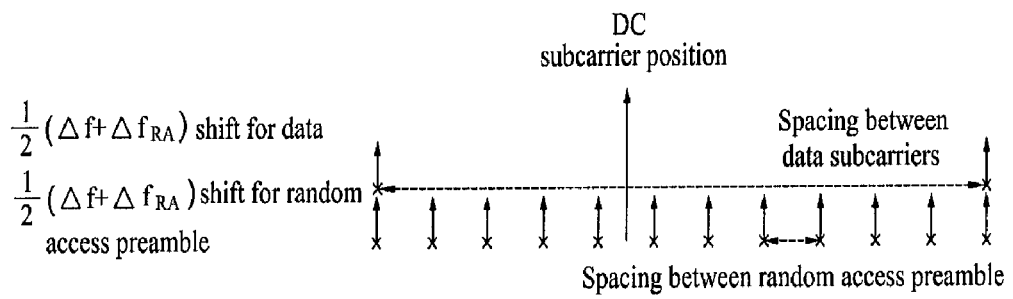
FIG. 6 illustrates a subcarrier shift method according to another exemplary embodiment of the present invention.

FIG. 6 illustrates a subcarrier shift method according to another exemplary embodiment of the present invention.

A base station may determine a shift value in consideration of spacing between random access preamble subcarriers even though data subcarriers are shifted, instead of differently processing data and a random access preamble. For example, the data and the random access preamble use the same shift value of $$\frac{1}{2}(\Delta f + \Delta f_{RA})$$

as illustrated in FIG. 6. Conventionally, DC distortion influences data evenly, namely, in the ratio of $$\frac{7.5}{15} : \frac{7.5}{15}$$

centering on a DC offset position. However, in FIG. 6, data located at both sides based on the DC offset position may experience different influences, namely, in the ratio of $$\frac{6.25}{15} : \frac{8.75}{15}.$$

In this case, since spacing between the data subcarriers is considerably wider than spacing between the random access preamble subcarriers, such influences are not great.

Values other than $$\frac{1}{2}(\Delta f + \Delta f_{RA})$$

may be used to shift the data subcarriers and the random access preamble subcarriers.

Methods using the DC subcarrier position without shift may be variously implemented. That is, to prevent DC distortion of the random access preamble, puncturing/avoidance schemes may be used.

Figure 7:
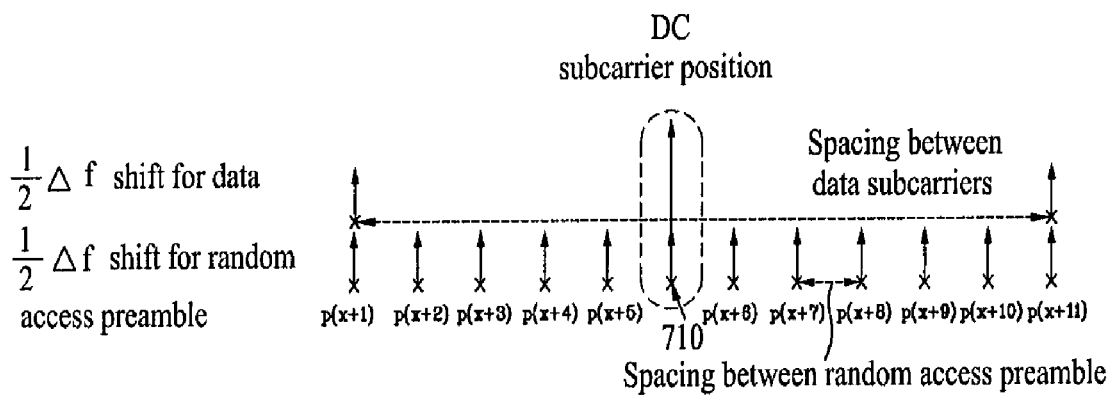
FIGS. 7 and 8 illustrate signal mapping methods according to exemplary embodiments of the present invention.

FIG. 7 illustrates a signal mapping method using a puncturing scheme according to exemplary embodiments of the present invention.

When reducing the length of a sequence by one and mapping the sequence to subcarriers, the sequence is mapped to the subcarriers by avoiding a DC subcarrier as illustrated in FIG. 7. For a random access preamble which does not include the DC subcarrier, the sequence is mapped starting with the front subcarrier so that the length of the sequence is used, or one predetermined position may be empty.

Figure 8:
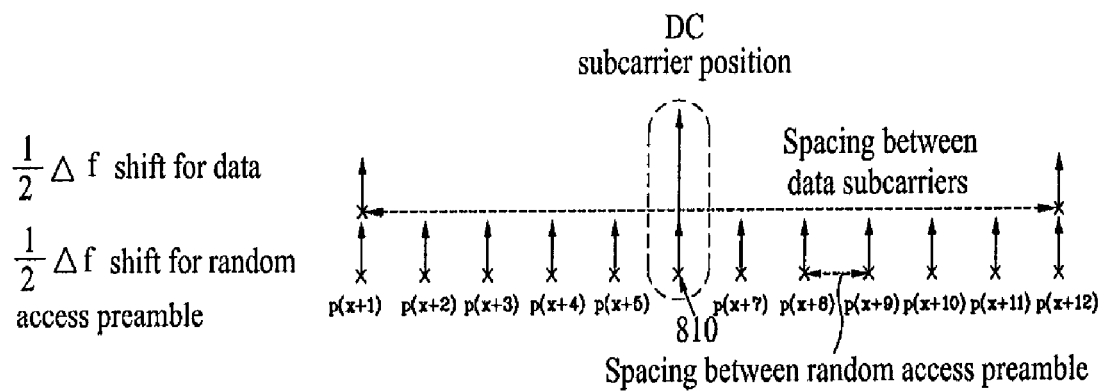

FIG. 8 illustrates a signal mapping method using an avoidance scheme according to exemplary embodiments of the present invention.

As illustrated in FIG. 8, a corresponding subcarrier may actually not be used only when a sequence of a conventional length is used and a DC subcarrier is present. When using the puncturing scheme, a transmitting end and a receiving end should consider the position of the DC subcarrier.

Meanwhile, a sequence puncturing scheme as shown in FIG. 8 may be applied to only the receiving end without being applied to both the transmitting end and the receiving end. The transmitting end may transmit a random access preamble without considering the DC subcarrier and the receiving end may detect the random access preamble except for a distorted signal from the DC subcarrier. If only the receiving end considers the DC subcarrier, although DC distortion of a signal transmitted from the DC subcarrier may affect subcarriers in the vicinity of the CD subcarrier, the influence is not great.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a signal mapping method and a signal transmission method that can minimize DC distortion even when spacing between data subcarriers is a multiple of spacing between random access preamble subcarriers, by applying a subcarrier shift method.

The invention claimed is:

1. A method for shifting subcarriers for transmission of an uplink signal including a random access preamble and mapping a signal to the shifted subcarriers, the method comprising:

shifting both positions of data subcarriers and positions of random access preamble subcarriers by as much as a frequency band corresponding to half of spacing between the data subcarriers on a frequency axis; and mapping data to the data subcarriers and mapping a random access preamble to subcarriers except for a subcarrier corresponding to a direct current DC subcarrier position among the positions of the random access preamble subcarriers, transmitting the mapped data and random access preamble to an uplink, wherein mapping the random access preamble reduces a sequence length of the random access preamble by as much as a subcarrier length corresponding to the DC subcarrier position.

2. The method according to claim 1, wherein the spacing between the random access preamble subcarriers is one of 1250 Hz, 7500 Hz, and 1875 Hz.

3. The method according to claim 1, wherein the spacing between the data subcarriers is 15 KHz.

* * * * *